US012250525B2

(12) United States Patent
Selfon et al.

(10) Patent No.: US 12,250,525 B2
(45) Date of Patent: Mar. 11, 2025

(54) ONE-TOUCH SPATIAL EXPERIENCE WITH FILTERS FOR AR/VR APPLICATIONS (71) Applicant: Meta Platforms Technologies, LLC, Menlo Park, CA (US)

(72) Inventors: Scott Phillip Selfon, Kirkland, WA (US); Andrew Lovitt, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 177 days.

(21) Appl. No.: 17/833,631

(22) Filed: Jun. 6, 2022

(65) Prior Publication Data
US 2023/0049175 A1 Feb. 16, 2023

Related U.S. Application Data (60) Provisional application No. 63/301,269, filed on Jan. 20, 2022, provisional application No. 63/233,143, filed on Aug. 13, 2021.

(51) Int. Cl.
G06V 20/20 (2022.01)
G06F 3/0482 (2013.01)
(Continued)

(52) U.S. Cl.
CPC ........... H04R 3/005 (2013.01); G06F 3/0482 (2013.01); G06V 20/40 (2022.01); G11B 27/031 (2013.01);
(Continued)

(58) Field of Classification Search
CPC .... G06F 1/163; G06F 3/04815; G06F 3/0482; G06V 20/20; G06V 20/40; G11B 27/031;
(Continued)

(56) References Cited

U.S. PATENT DOCUMENTS 10,841,693 B1  11/2020 Ganeshkumar et al.
2012/0278070 A1  11/2012 Herve et al.
(Continued)

FOREIGN PATENT DOCUMENTS

EP  2824663 A2  1/2015
EP  3343348 A1  7/2018
WO  WO-2020079485 A2 *  4/2020  ............ G03B 31/00

OTHER PUBLICATIONS

EPO—International Search Report and Written Opinion for International Application No. PCT/US2022/040277, mailed Dec. 2, 2022, 11 pages.
(Continued)

Primary Examiner — Daquan Zhao
(74) Attorney, Agent, or Firm — McDermott Will & Emery LLP (57) ABSTRACT A method to assess user condition for wearable devices using electromagnetic sensors is provided. The method includes receiving a signal from an electromagnetic sensor, the signal being indicative of a health condition of a user of a wearable device, selecting a salient attribute from the signal, and determining, based on the salient attribute, the health condition of the user of the wearable device. A non-transitory, computer-readable medium storing instructions which, when executed by a processor, cause a system to perform the above method, and the system, are also provided.

9 Claims, 7 Drawing Sheets (51) Int. Cl.
| | |
|---|---|
| *G06V 20/40* | (2022.01) |
| *G11B 27/031* | (2006.01) |
| *G11B 27/10* | (2006.01) |
| *H04N 5/76* | (2006.01) |
| *H04R 1/40* | (2006.01) |
| *H04R 3/00* | (2006.01) |

(52) U.S. Cl.
CPC .............. *G11B 27/10* (2013.01); *H04N 5/76* (2013.01); *H04R 1/406* (2013.01); *H04R 2201/401* (2013.01); *H04R 2410/01* (2013.01)

(58) Field of Classification Search
CPC ........ G11B 27/10; H04N 5/76; H04N 9/8205; H04N 9/8211; H04R 1/406; H04R 2201/401; H04R 2410/01; H04R 2430/23; H04R 2460/01; H04R 3/005; H04R 5/033; H04S 2400/11; H04S 7/302
USPC ................................ 386/280, 278, 239, 248
See application file for complete search history.

(56) References Cited

U.S. PATENT DOCUMENTS

| | | |
|---|---|---|
| 2016/0205488 A1 | 7/2016 | Gomez |
| 2017/0098453 A1 | 4/2017 | Wright et al. |
| 2017/0295446 A1 | 10/2017 | Thagadur Shivappa |
| 2018/0217806 A1 | 8/2018 | Jang |
| 2018/0341455 A1 | 11/2018 | Ivanov et al. |
| 2018/0349088 A1* | 12/2018 | Leppänen ............... G06F 3/011 |
| 2019/0139312 A1* | 5/2019 | Leppänen ............. G06F 3/0486 |
| 2019/0187779 A1 | 6/2019 | Miller |
| 2019/0320282 A1 | 10/2019 | Moeller |
| 2019/0342693 A1 | 11/2019 | Norris et al. |
| 2020/0059717 A1 | 2/2020 | Chang et al. |
| 2021/0043167 A1 | 2/2021 | Cartier et al. |
| 2021/0092232 A1 | 3/2021 | Norris et al. |
| 2021/0104222 A1 | 4/2021 | Laroche et al. |
| 2021/0173614 A1 | 6/2021 | Shin et al. |
| 2021/0295849 A1 | 9/2021 | Van Der Ven et al. |
| 2022/0217490 A1 | 7/2022 | Lyren et al. |
| 2022/0238091 A1 | 7/2022 | Jasleen et al. |
| 2022/0417687 A1 | 12/2022 | Lyren et al. |

OTHER PUBLICATIONS

EPO—International Search report and Written Opinion for International Application No. PCT/US2022/040281, mailed Nov. 22, 2022, 14 pages.

EPO—Invitation to Pay Additional Fees for International Application No. PCT/US2022/040283, mailed Dec. 7, 2022, 14 pages.

Shang J., et al., "Enabling Secure Voice Input on Augmented Reality Headsets using Internal Body Voice," 16th Annual IEEE International Conference on Sensing, Communication, and Networking (SECON), 2019, pp. 1-9.

Turan M.A. T., et al., "Source and Filter Estimation for Throat-Microphone Speech Enhancement," IEEE/ACM Transactions on Audio, Speech, and Language Processing, vol. 24, No. 2, Feb. 2016, pp. 265-275.

USPTO—Office Action mailed on Dec. 7, 2023 for related U.S. Appl. No. 17/824,321, pp. 14 pgs.

* cited by examiner

ONE-TOUCH SPATIAL EXPERIENCE WITH FILTERS FOR AR/VR APPLICATIONS

CROSS-REFERENCE TO RELATED APPLICATIONS

The present disclosure is related and claims priority under 35 U.S.C. § 119(e) to U.S. Provisional Pat. Appln. No. 63/233,143 entitled AUDIO HARDWARE AND SOFTWARE FOR SMART GLASSES, filed on Aug. 13, 2021, to Andrew LOVITT et al., and to U.S. Provisional Pat. Appln. No. 63/301,269 entitled ONE-TOUCH SPATIAL EXPERIENCE WITH FILTERS FOR AR/VR APPLICATIONS, filed on Jan. 20, 2022, to Scott P. SELFON et al., the contents of which applications are hereinafter incorporated by reference, in their entirety, for all purposes.

BACKGROUND

Field

The present disclosure is directed to playing a headset recording of an event. More specifically, embodiments as disclosed herein are directed to providing selective audio configurations in the playing of an immersive reality recording of an event collected from a smart glass.

Related Art

In the field of wearable devices, recording of old events is well documented. However, these recordings typically lack the quality and desired focus of an ulterior rendition or replay of the event. This happens typically because, in hindsight, the user may have shifted his/her focus of attention to an element which, at the time of the recording, may not have even been noticeable by the user. This is especially true for the audio of event recordings, typically collected with a single microphone and therefore reproducing all noise sources and ambient interferences, to the frustration of a listener that would like to focus on a specific conversation or audio source.

BRIEF DESCRIPTION OF THE DRAWINGS

In the figures, elements having the same or similar reference labels have the same or similar attributes and description, unless explicitly stated otherwise.

SUMMARY

In a first embodiment, a computer-implemented method includes receiving, from a user of an immersive reality application, a selection of a first sound source from a recorded video in a display of a client device, the recorded video provided by a headset at an event including a headset user, identifying a direction of audio for the first sound source relative to the headset user, and enhancing an audio signal in the recorded video from the first sound source based on the direction of audio.

In a second embodiment, a headset includes a camera configured to record a video of an event including a headset user, one or more microphones spatially distributed on a headset frame and configured to record multiple soundtracks from multiple audio sources in the event, and a processor configured to wirelessly transmit the video of the event and the soundtracks to a client device.

In a third embodiment, a computer-implemented method includes recording in a camera mounted on a headset, upon receipt of a command from a user of the headset, an event including multiple sound sources, identifying, from the sound sources, a first sound source that is of interest for the user and a noise source, and activating multiple microphones mounted on the headset to include in the recording based on a first direction for the first sound source and a second direction for the noise source, relative to the headset.

In a third embodiment, a system includes a memory storing instructions and one or more processors configured to execute the instructions and cause the system to perform a method. The method includes receiving, from a user of an immersive reality application, a selection of a first sound source from a recorded video in a display of a client device, the recorded video provided by a headset at an event including a headset user, identifying a direction of audio for the first sound source relative to the headset user, and enhancing an audio signal in the recorded video from the first sound source based on the direction of audio.

In yet another embodiment, a system includes a first means to store instructions, and a second means to execute the instructions to cause the system to perform a method. The method includes receiving, from a user of an immersive reality application, a selection of a first sound source from a recorded video in a display of a client device, the recorded video provided by a headset at an event including a headset user, identifying a direction of audio for the first sound source relative to the headset user, and enhancing an audio signal in the recorded video from the first sound source based on the direction of audio.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

Wearable devices for the user head typically include a plurality of sensors such as microphones and cameras, which the user may activate as recorders, during an event. A user replaying the recorded event at an ulterior time, however, may be interested in a particular audio source during the event that the user may not have been aware of, nor interested in, at the time of the recording. Accordingly, embodiments as disclosed herein enable the user to single out, isolate, and enhance the audio signal of a selected sound source for replay, after the event recording.

In some embodiments, smart glasses include multiple microphones arranged in a distributed geometry on the frame of the smart glasses. During a recording event, each of the microphones in the distributed geometry is recorded on a separate track. The multiple tracks are combined to select a particular direction of audio corresponding to the direction of a selected audio source by the user. The user may select the audio source of interest based on a personal interest for a conversation, piece of music, even noise, or any other audio source from the event, at a time after the event was recorded.

Embodiments as disclosed herein include hardware and software filters to identify sound sources, and also inertial measurement units (IMUs), motion sensors, and the like to provide geolocation and distance measurements, and thus provide a more accurate assessment of the absolute and relative location of a sound source and the smart glass recording it.

Figure 1:
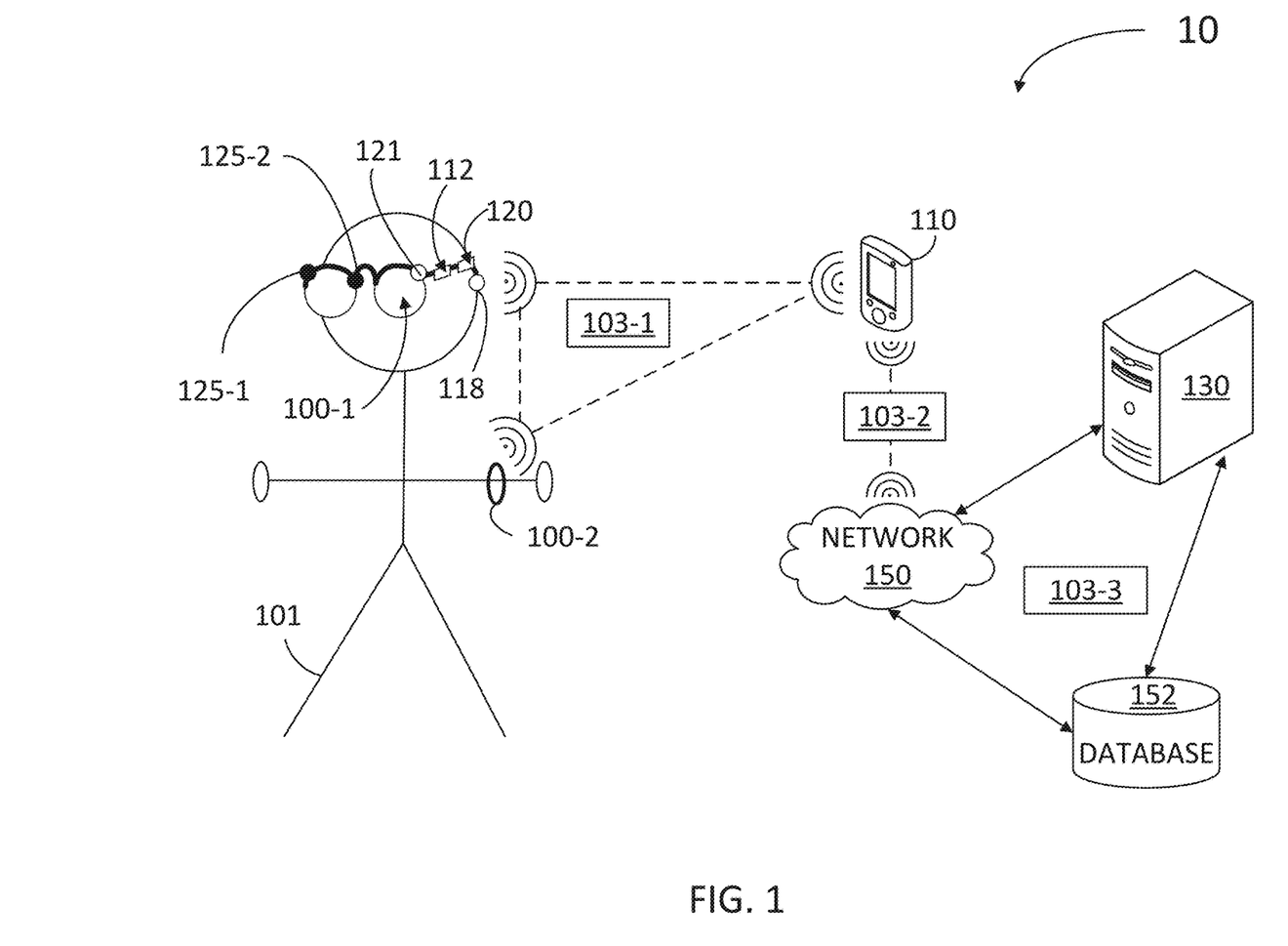
FIG. 1 illustrates an architecture including one or more wearable devices coupled to one another, to a mobile device, a remote server and to a database, according to some embodiments.

FIG. 1 illustrates an architecture 10 including wearable devices 100-1 and 100-2 (hereinafter, collectively referred to as "wearable devices 100") with a user 101, coupled to one another and to a mobile device 110, a remote server 130, and to a database 152, via a network 150, according to some embodiments. Wearable devices 100 may include a smart glass (also referred to hereinafter as "headset") 100-1 and a wrist-band 100-2 (or "watch"), and mobile device 110 may be a smart phone, all of which may communicate with one another via wireless communications. Wearable devices 100 and mobile device 110 exchange a first dataset 103-1. Dataset 103-1 may include a recorded video, audio, or some other file or streaming media. The user of smart glass 100-1 is also the owner or is associated with mobile device 110. In some embodiments, at least one of the one or more wearable devices 100 (e.g., smart glass 100-1) may directly communicate with remote server 130, database 152, or any other client device (e.g., a smart phone of a different user, and the like) via network 150.

Mobile device 110 may be communicatively coupled with remote server 130 and database 152 via network 150, and transmit/share information, files, and the like with one another (e.g., dataset 103-2 and dataset 103-3).

In some embodiments, smart glass 100-1 may include multiple sensors 120 such as inertial measurement units (IMUs), gyroscopes, microphones, cameras, and the like mounted within the frame of the headset. Other sensors 120 that can be included in smart glass 100-1 may include magnetometers, an acoustic microphone 125-1 or a contact microphone 125-2 (hereinafter, collectively referred to as "microphones 125"), photodiodes and cameras, touch sensors and other electromagnetic devices such as capacitive sensors, a pressure sensor, and the like.

In addition, smart glass 100-1, and any other wearable device 100, or mobile device 110 may include a memory circuit 122 storing instructions, and a processor circuit 112 configured to execute the instructions to cause smart glass 100-1 to perform, at least partially, some of the steps in methods consistent with the present disclosure. In some embodiments, smart glass 100-1, wrist-watch 100-2, or any wearable device 100, mobile device 110, server 130, and/or database 152 may further include a communications module 118 enabling the device to wirelessly communicate with a remote server via network 150. In some embodiments, communications module 118 can include, for example, radio-frequency hardware (e.g., antennas, filters analog to digital converters, and the like) and software (e.g., signal processing software). Smart glass 100-1 may thus download a multimedia online content (e.g., dataset 103-1) from remote server 130, to perform at least partially some of the operations in methods as disclosed herein. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Figure 2:
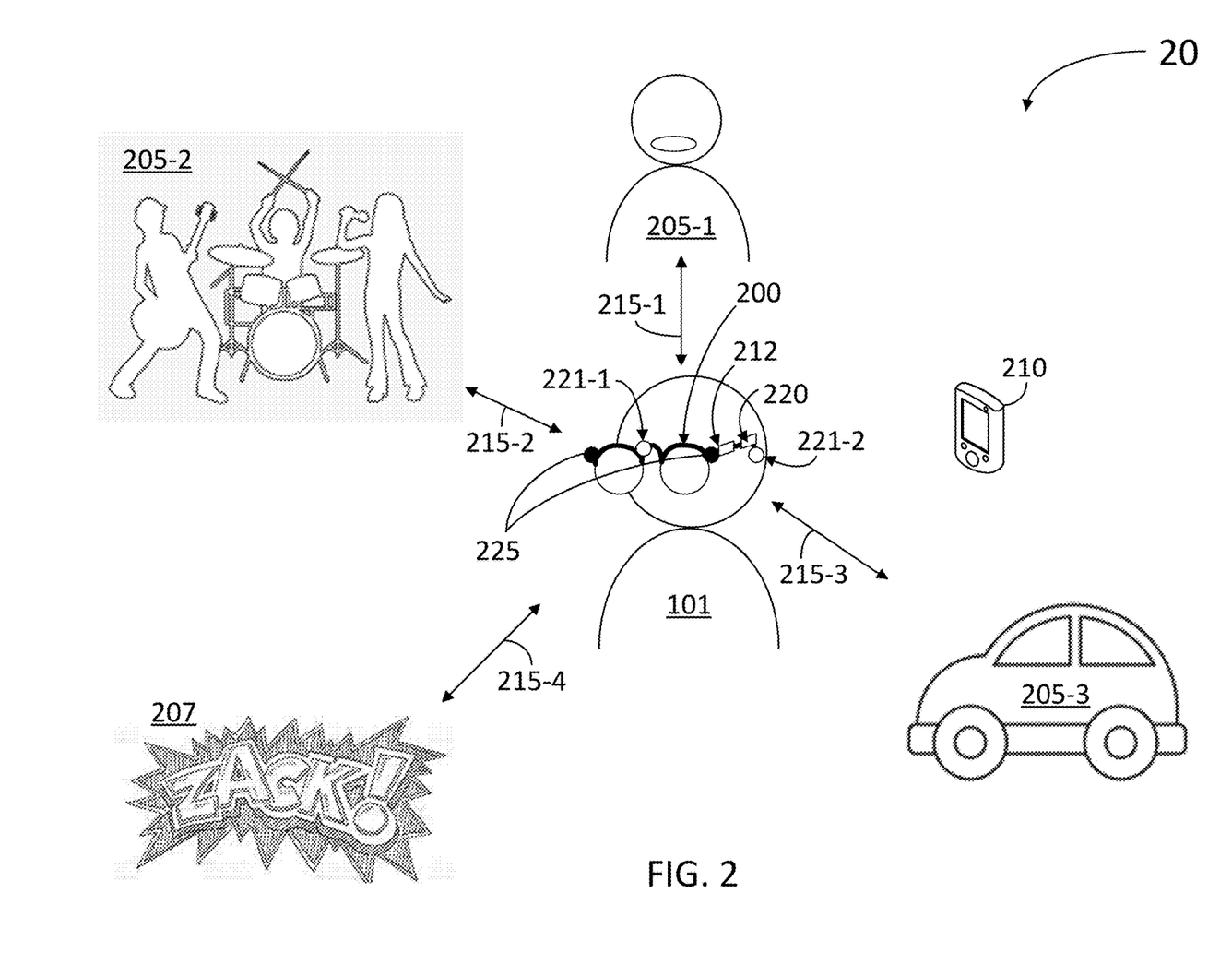
FIG. 2 illustrates a user of a smart glass recording an event among multiple sound and noise sources, according to some embodiments.

FIG. 2 illustrates user 101 of smart glass 200 recording an event 20 among multiple sound sources 205-1, 205-2, and 205-3 (hereinafter, collectively referred to as "sound sources 205"), and noise 207, according to some embodiments. In some embodiments, smart glass 200 includes a forward camera 221-1 and a backward camera 221-2 (hereinafter, collectively referred to as "cameras 221") configured to record a video of event 20 including user 101, and one or more microphones 225 spatially distributed on a headset frame and configured to record multiple soundtracks from each of sound sources 205 in event 20. In some embodiments, smart glass 200 also includes a processor 212 configured to wirelessly transmit the video of event 20 and the soundtracks from sound sources 205 to a client device 210. In some embodiments, memory 220 in smart glass 200 may be configured to store the video of the event, the soundtracks, and a specific location and settings of each of the spatially distributed microphones 225 in smart glass 200.

In some embodiments, processor 212 further includes a clock that is configured to identify a time of arrival of a sound waveform at each of microphones 225, and processor 212 is further configured to wirelessly transmit the time of arrival of the sound waveform at each of microphones 225. In some embodiments, processor 212 is configured to form a three-dimensional reconstruction of event 20 based on images captured with forward-looking camera 221-1 and with backward-looking camera 221-2. In some embodiments, at least one of the microphones 225 is configured to capture an ambient sound of the event.

The user is typically exposed to multiple sound sources 205. For example, a first sound source 205-1 may be a person sitting or standing next to the user, and engaged in conversation therewith. A second sound source 205-2 may be a band playing music, and a third sound source 205-3 may be a moving object, such as a person, a car, an airplane, a toy, or some other object. Other sound sources may simply be noise 207, having a clear and definite origin (e.g., dishes and utensils clattering at a nearby table, or pots and jars clashing in a kitchen, or a TV or other device turned on somewhere around user 101, rain, snow, a car engine, an airplane background noise, ocean waves at the beach, and the like). In some embodiments, each of sound sources 205 and noise 207 may have a clear, identifiable direction of arrival (DoA), 215-1, 215-2, 215-3, and 215-4 (hereinafter, collectively referred to as "DoAs 215").

In some embodiments, it is desirable to identify precisely DoAs 215 for each sound source 205 or noise 207. To do this, embodiments as disclosed herein use a time of arrival of a sound waveform from each of sound sources 205 and noise 207 to each of microphones 225 that are spatially distributed on smart glass 200. For a single sound source 205, a DoA 215 may be determined by assessing the difference in time of arrival to each one of microphones 225. Accordingly, a multilinear regression may be solved for a unique vector, DoA 215, associated with the source of the acoustic wave reaching each of microphones 225 ever so slightly at a different time.

During a recording of event 20, each of the soundtracks from each of microphones 225 is recorded separately, together with a common clock signal for all the microphones 225, controlled by processor circuit 212 and stored by memory circuit 220 in smart glass 200. In some embodiments, the clock signal may be separate for each, or at least some of the microphones 225. In this case, the different clock signals may be synchronized at a centralized processor (e.g., processors 112 and 212).

Figure 3:
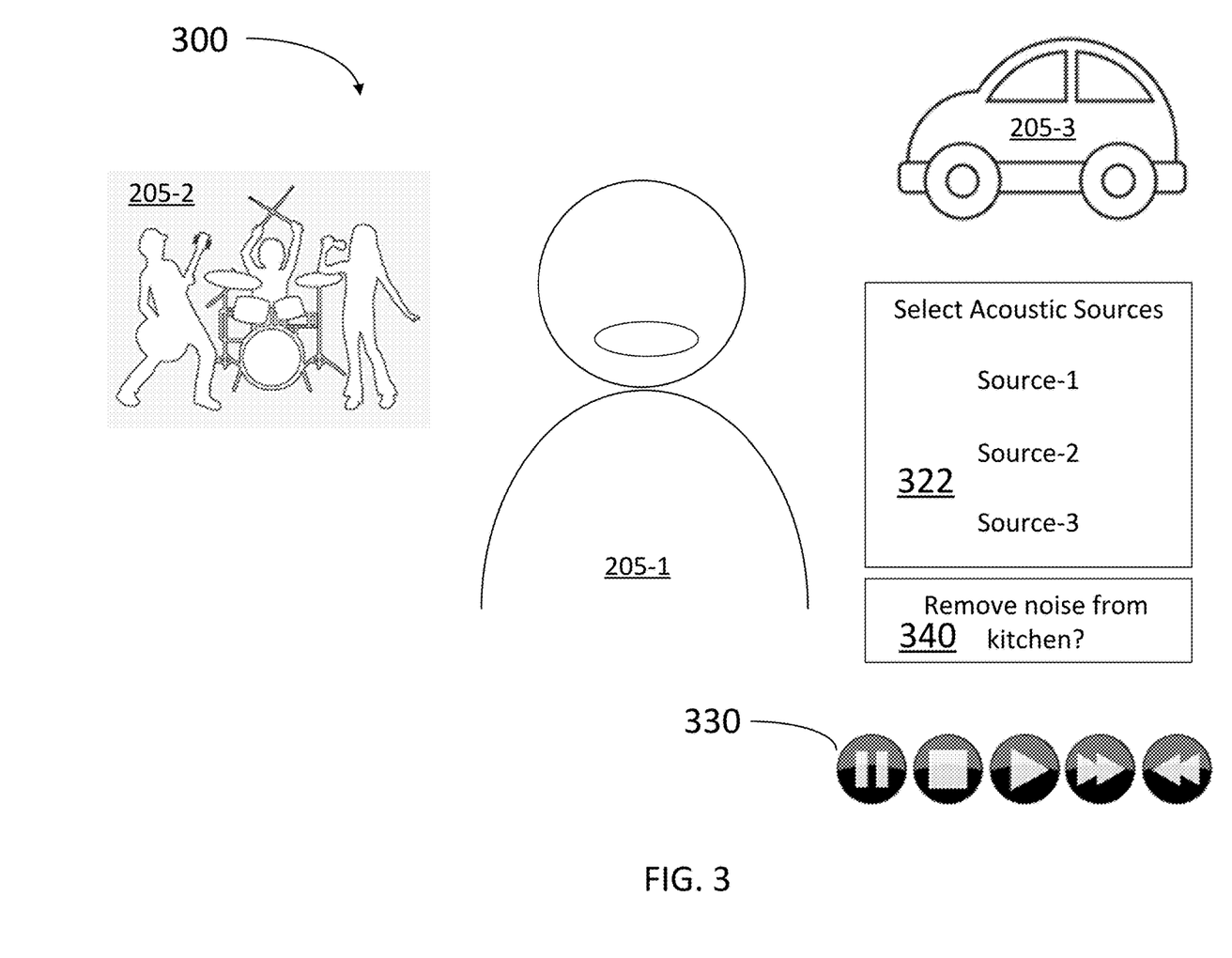
FIG. 3 illustrates a view of a playback of a video in an immersive reality application, the video recorded on a smart glass, according to some embodiments.

FIG. 3 illustrates a view of a playback video 330 in an immersive reality application 300, the video recorded on a smart glass (e.g., smart glass 100-1 or 200), according to some embodiments. Sound sources 205 (source 1, source 2, source 3, and others) appear in the recorded video 300, together with a menu 322 for selecting sound sources, or removing a noise source 340 from the played sound. Accordingly, a user of application 300 may select a sound source 205 to enhance the sound coming from that source. The selection may be done by clicking on menu 322. In some embodiments, the user of application 300 may simply click within a specific visual element that is part of the sound source on the display (e.g., a member of the jazz band in sound source 205-2, and the like).

In some embodiments, playback video 330 may be displayed in the smart glass itself, and immersive application 300 may be installed in a memory of the smart glass. In some embodiments, playback video 330 may be played in a client device wirelessly coupled with the smart glass (e.g., a paired up smart phone, or laptop, and the like). In some embodiments, playback video 330 may be played in a client device that is down-streaming the video from a remote server or database (after validating all appropriate permissions, credentials, and other security and privacy safeguards at the remote server, client device, and smart glass levels). Accordingly, the user of immersive application 300 may or may not be the user of the smart glass, who presumably recorded playback video 330.

In some embodiments, a display reproducing playback video 330 may highlight the images corresponding to the specific sound source 205 listed on menu 322. In fact, in some embodiments, the display may highlight the image for each of the sound sources 205 as the user of application 300 hovers a mouse or a pointer over the text of menu 322, or over each of the names of the sources on menu 322. In some embodiments, immersive application 300 may in fact give colloquial or real names to each of sound sources 205 (e.g., sound source 205-1="Karen Leibovitz," sound source 205-2="Jazz Band," sound source 205-3="traffic on Lombard street," noise source 340: "kitchen rumble," or "restaurant chatter," or "engine humming").

Figure 4:
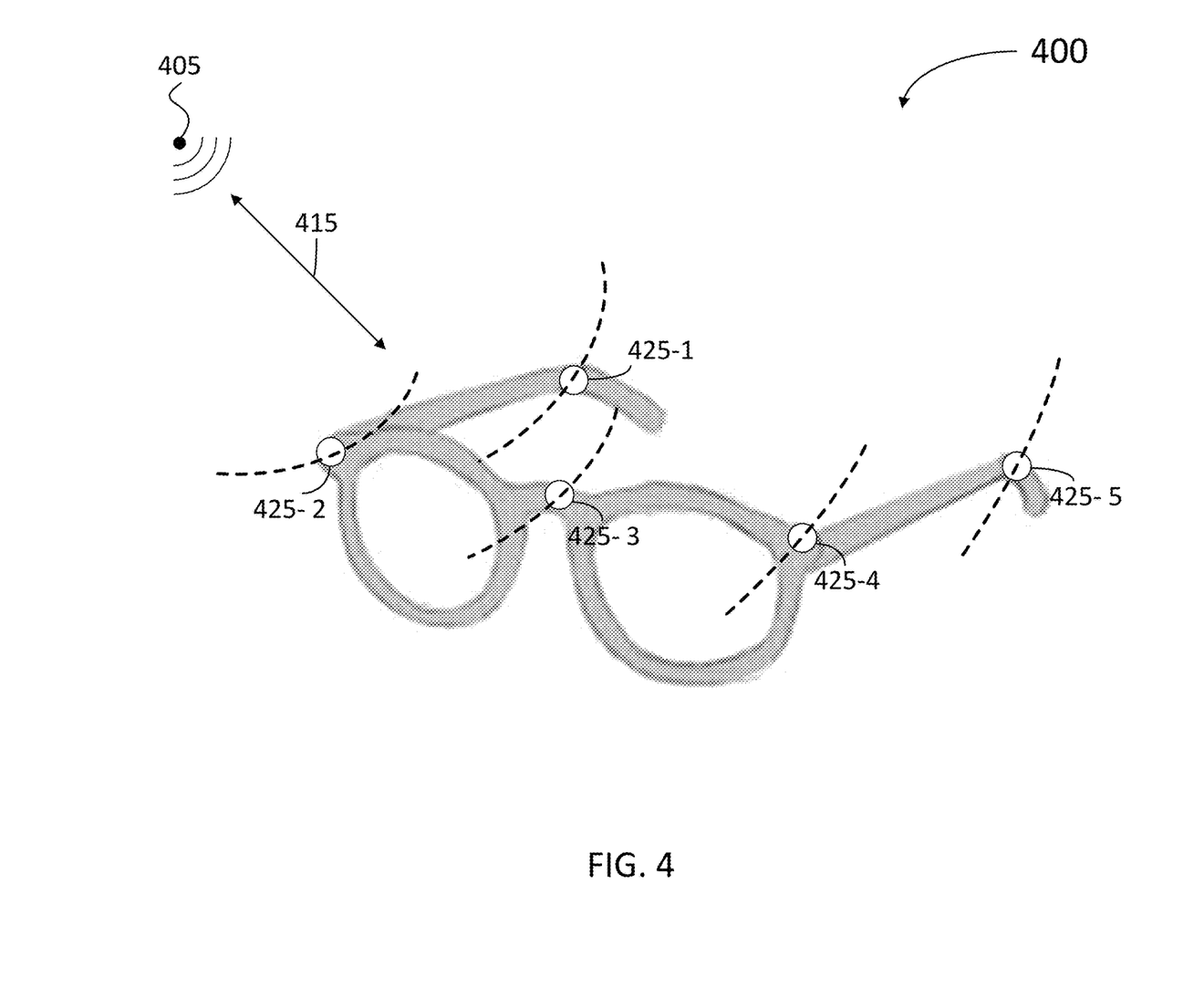
FIG. 4 illustrates a selection of a direction of arrival of an audio source from multiple microphones on a smart glass, according to some embodiments.

FIG. 4 illustrates a selection of a direction of arrival (DoA) 415 of a sound source 405 from multiple microphones 425-1, 425-2, 425-3, 425-4, and 425-5 (hereinafter, collectively referred to as "microphones 425") on a smart glass 400, according to some embodiments. Accordingly, DoA 415 may be selected based on the difference in time of arrival of a sound waveform to each of spatially distributed microphones 425. In some embodiments, it may suffice to know the difference in time of arrival to assess DoA 415 as a unit vector having two direction cosines. In some embodiments, the system may be able to determine the specific location of sound source 405 relative to smart glass 400 and even relative to geocoordinates.

In some embodiments, the assessment of DoA 415 and location of sound source 405 may include resolving a linear regression problem associating times of arrival or sound signals to each of microphones 425 based on DoA 415 and the speed of sound. To determine the time of arrival, the system may be configured to select a characteristic portion of the waveform generated by sound source 405, which may be easily identifiable using digital filters at each microphone 425. In some embodiments, and to enhance accuracy, the entire waveform or a substantive portion thereof may be used to match the origin of sound source 405, iteratively. Other filtering techniques using hardware or software may be implemented, to identify distinct sound sources involved in any given event. In some embodiments, the software may include non-linear techniques such as non-linear regression, neural networks, machine learning (ML, and likewise approximations), and artificial intelligence. Accordingly, in some embodiments, the system may include geolocation sensors and devices (e.g., IMU sensors) to better identify location and distances in the user environment at the time of the event recording.

Figure 5:
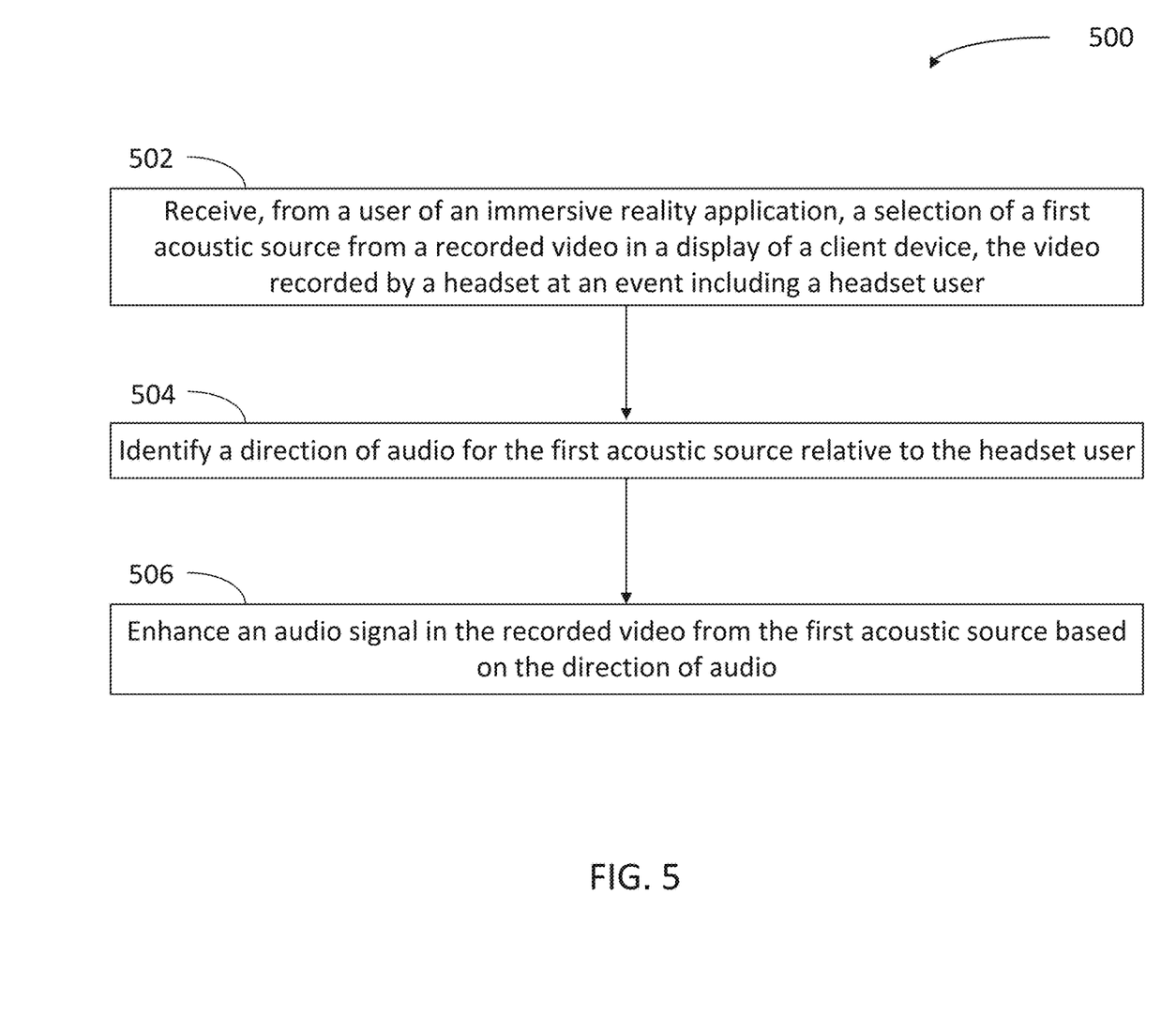
FIG. 5 is a flowchart illustrating steps in a method for playing, in an immersive reality application, a recording of an event made with a smart glass, according to some embodiments.

FIG. 5 is a flowchart illustrating steps in a method 500 for playing, in an immersive reality application, a recording of an event made with a smart glass, according to some embodiments. In some embodiments, at least one or more of the steps in method 500 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 500 may be performed by a processor executing instructions stored in a memory, wherein either the processor or the memory, or both, are part of a mobile device for the user, a remote server or a database, communicatively coupled with each other via a network (e.g., processors 112 and 212, memories 122 and 220, mobile devices 110 and 210, server 130, and network 150). Moreover, the mobile device, the smart glass, and the wearable devices may be communicatively coupled with each other via a wireless communication system and protocol (e.g., communications module 118 including a radio, Wi-Fi, Bluetooth, near-field communication—NFC—and the like). In some embodiments, a method consistent with the present disclosure may include one or more steps from method 500 performed in any order, simultaneously, quasi-simultaneously, or overlapping in time.

Step 502 includes receiving, from a user of an immersive reality application, a selection of a first sound source from a recorded video in a display of a client device, the recorded video provided by a headset at an event including a headset user. In some embodiments, step 502 further includes identifying multiple sound sources from the recorded video in the display, and providing a menu of the sound sources to the user of the immersive reality application. In some embodiments, step 502 further includes identifying multiple sound sources from the recorded video by correlating an image recognition on the recorded video with multiple audio tracks in the recorded video, the audio tracks corresponding to multiple microphones spatially distributed on the headset. In some embodiments, step 502 includes identifying an indicator actuating on an image associated to the first sound source by the user of the immersive reality application on a graphic user interface of the client device. In some embodiments, step 502 further includes receiving the recorded video from the headset, the recorded video including multiple soundtracks from multiple microphones spatially distributed on the headset, and storing the recorded video in a remote database, including the soundtracks and a specific location of each microphone on the headset associated with each soundtrack.

Step 504 includes identifying a direction of audio for the first sound source relative to the headset user. In some embodiments, step 504 includes correlating multiple waveforms from each of multiple soundtracks collected from each of multiple microphones spatially distributed on the headset with a time of arrival of the waveforms to the microphones, and determining a location of the first sound source based on the time of arrival. In some embodiments, the first sound source is a moving object, and step 504 includes identifying a speed and a direction of motion of the first sound source.

Step 506 includes enhancing an audio signal in the recorded video from the first sound source based on the direction of audio. In some embodiments, step 506 includes adding multiple waveforms from multiple soundtracks collected from each of multiple microphones in the headset, in phase relative to a time of arrival of the waveforms to the microphones based on the direction of audio from the first sound source. In some embodiments, step 506 includes identifying a second sound source from the recorded video, further including removing an audio signal from the second sound source by adding multiple waveforms from multiple soundtracks collected from each of multiple microphones in the headset, out of phase relative to a time of arrival of the waveforms to the microphones based on a direction of audio from the second sound source. In some embodiments, step 506 further includes identifying a noise source from the recorded video, and enhancing the audio signal from the first sound source includes removing the noise source by adding multiple waveforms from multiple soundtracks collected from each of multiple microphones in the headset, out of phase relative to a time of arrival of the waveforms to the microphones from a direction different from the direction of audio from the first sound source.

Figure 6:
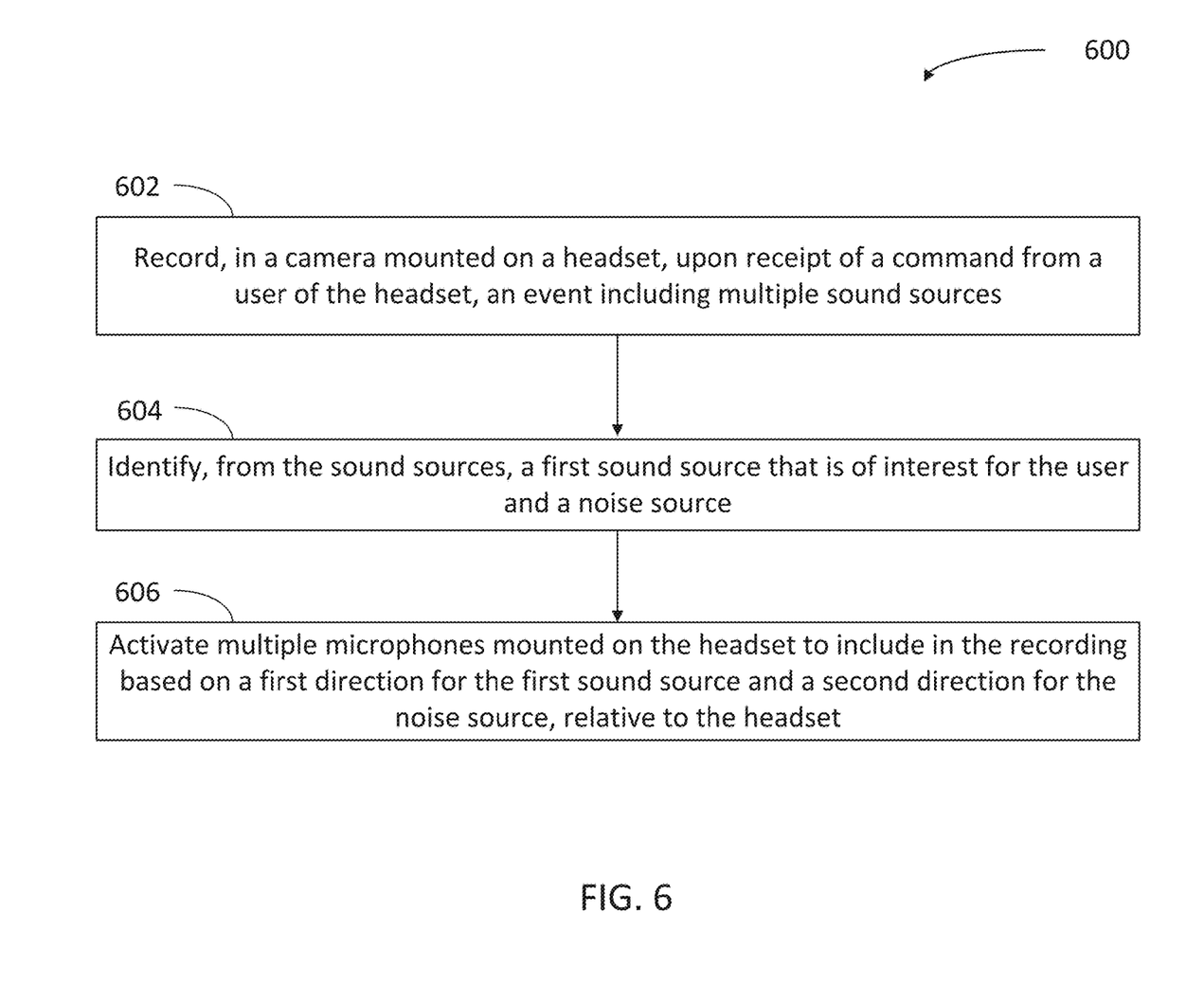
FIG. 6 is a flowchart illustrating steps in a method for providing an immersive experience from a recording in augmented reality/virtual reality applications, according to some embodiments.

FIG. 6 is a flowchart illustrating steps in a method 600 for providing an immersive experience from a recording in augmented reality/virtual reality applications, according to some embodiments. In some embodiments, at least one or more of the steps in method 600 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 600 may be performed by a processor executing instructions stored in a memory, wherein either the processor or the memory, or both, are part of a mobile device for the user, a remote server, or a database, communicatively coupled with each other via a network (e.g., processors 112 and 212, memories 122 and 220, mobile devices 110 and 210, server 130, and network 150). Moreover, the mobile device, the smart glass, and the wearable devices may be communicatively coupled with each other via a wireless communication system and protocol (e.g., communications module 118 including a radio, Wi-Fi, Bluetooth, near-field communication—NFC—and the like). In some embodiments, a method consistent with the present disclosure may include one or more steps from method 600 performed in any order, simultaneously, quasi-simultaneously, or overlapping in time.

Step 602 includes recording in a camera mounted on a headset, upon receipt of a command from a user of the headset, an event including multiple sound sources.

Step 604 includes identifying, from the sound sources, a first sound source that is of interest for the user and a noise source.

Step 606 includes activating multiple microphones mounted on the headset to include in the recording based on a first direction for the first sound source and a second direction for the noise source, relative to the headset. In some embodiments, step 606 includes identifying the first direction relative to the headset based on a time delay of a signal from the first sound source onto each of the microphones. In some embodiments, step 606 includes enhancing, in a recorded video, an audio signal from the first sound source based on the first direction. In some embodiments, step 606 includes synchronizing the microphones and subtracting a signal from the noise source prior to recording the event including multiple sound sources. In some embodiments, step 606 includes recording each of the microphones on a separate audio track, including a position of each of the microphones in the headset.

Hardware Overview

Figure 7:
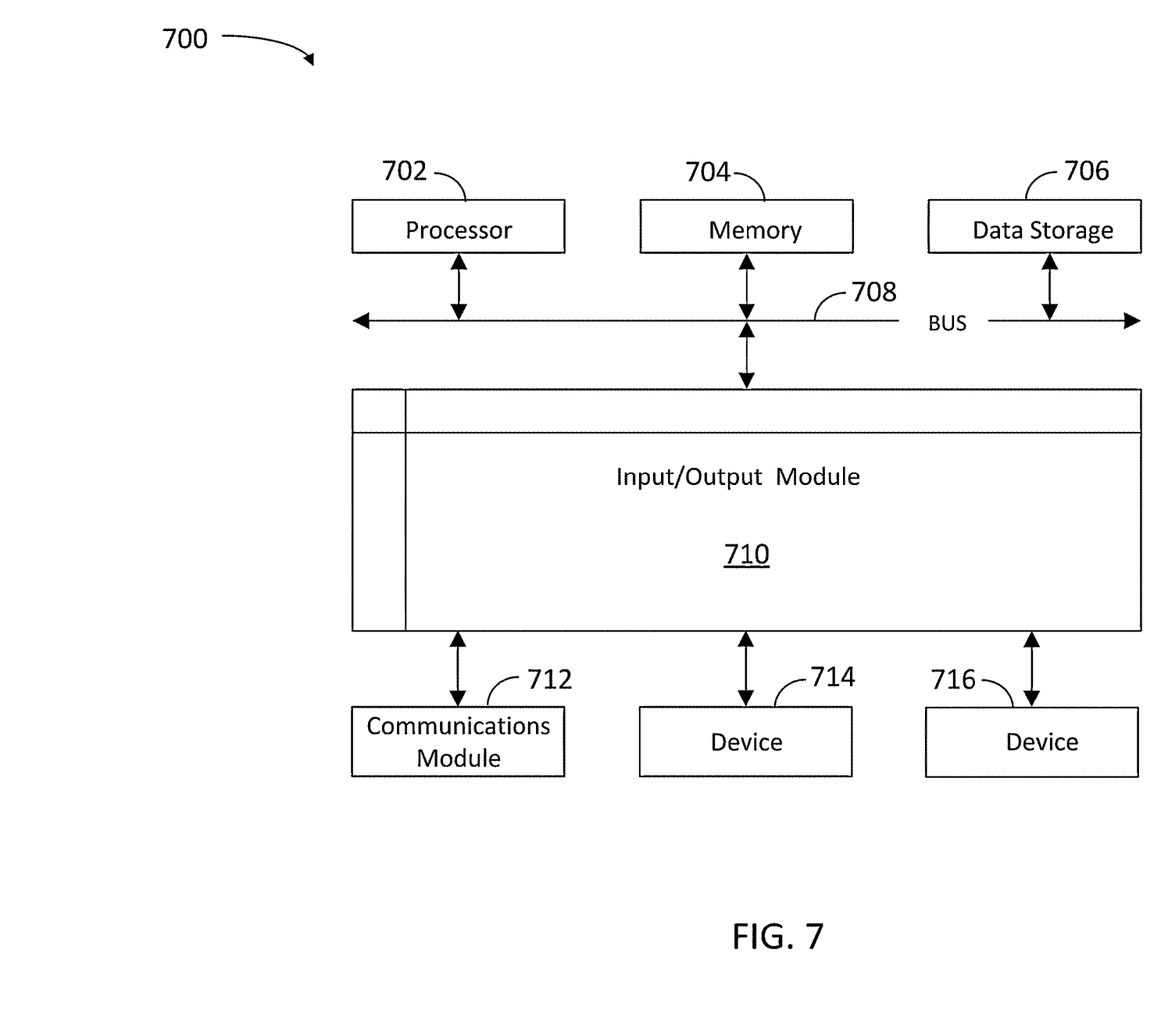
FIG. 7 is a block diagram illustrating a computer system for implementing a headset and methods for use thereof, according to some embodiments.

FIG. 7 is a block diagram illustrating a computer system for implementing a headset and methods for use thereof, according to some embodiments. In certain aspects, computer system 700 may be implemented using hardware or a combination of software and hardware, either in a dedicated server, or integrated into another entity, or distributed across multiple entities. Computer system 700 may include a desktop computer, a laptop computer, a tablet, a phablet, a smartphone, a feature phone, a server computer, or otherwise. A server computer may be located remotely in a data center or be stored locally.

Computer system 700 includes a bus 708 or other communication mechanism for communicating information, and a processor 702 (e.g., processor 112) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer-readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled with bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a consumer can provide input to the computer system 700. Other kinds of input devices 714 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 716 include display devices, such as an LCD (liquid crystal display) monitor, for displaying information to the consumer.

According to one aspect of the present disclosure, smart glass 100-1 can be implemented, at least partially, using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD- ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
receiving, from a user of an immersive reality application, a selection of a first sound source from a recorded video in a display of a client device, the recorded video provided by a headset at an event including a headset user;
identifying a direction of audio for the first sound source relative to the headset user; and
enhancing an audio signal in the recorded video from the first sound source based on the direction of audio,
wherein identifying a direction of audio for the first sound source comprises correlating multiple waveforms from each of multiple soundtracks collected from each of multiple microphones spatially distributed on the headset with a time of arrival of the waveforms to the microphones, and determining a location of the first sound source based on the time of arrival.

2. The computer-implemented method of claim 1, further comprising identifying multiple sound sources from the recorded video in the display, and providing a menu of the sound sources to the user of the immersive reality application.

3. The computer-implemented method of claim 1, further comprising identifying multiple sound sources from the recorded video by correlating an image recognition on the recorded video with multiple audio tracks in the recorded video, the audio tracks corresponding to multiple microphones spatially distributed on the headset.

4. The computer-implemented method of claim 1, wherein receiving a selection of a first sound source from a video comprises identifying an indicator actuating on an image associated to the first sound source by the user of the immersive reality application on a graphic user interface of the client device.

5. The computer-implemented method of claim 1, further comprising receiving the recorded video from the headset, the recorded video including multiple soundtracks from multiple microphones spatially distributed on the headset, and storing the recorded video in a remote database, including the soundtracks and a specific location of each microphone on the headset associated with each soundtrack.

6. The computer-implemented method of claim 1, wherein the first sound source is a moving object, and identifying a direction of audio of the first sound source comprises identifying a speed and a direction of motion of the first sound source.

7. The computer-implemented method of claim 1, wherein enhancing an audio signal from the first sound source comprises adding multiple waveforms from multiple soundtracks collected from each of multiple microphones in the headset, in phase relative to a time of arrival of the waveforms to the microphones based on the direction of audio from the first sound source.

8. The computer-implemented method of claim 1, further comprising identifying a second sound source from the recorded video, and enhancing the audio signal from the first sound source comprises removing an audio signal from the second sound source by adding multiple waveforms from multiple soundtracks collected from each of multiple microphones in the headset, out of phase relative to a time of arrival of the waveforms to the microphones based on a direction of audio from the second sound source.

9. The computer-implemented method of claim 1, further comprising identifying a noise source from the recorded video, and enhancing the audio signal from the first sound source comprises removing the noise source by adding multiple waveforms from multiple soundtracks collected from each of multiple microphones in the headset, out of phase relative to a time of arrival of the waveforms to the microphones from a direction different from the direction of audio from the first sound source.

* * * * *